US012567352B2

(12) United States Patent
Cheng

(10) Patent No.: US 12,567,352 B2
(45) Date of Patent: Mar. 3, 2026

(54) METHOD, APPARATUS, DEVICE, AND STORAGE MEDIUM FOR COMPENSATING DISPLAY PANEL

(71) Applicant: KunShan Go-Visionox Opto-Electronics Co., Ltd, Kunshan (CN)

(72) Inventor: Yiming Cheng, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 18/678,262

(22) Filed: May 30, 2024

(65) Prior Publication Data

US 2024/0321171 A1 Sep. 26, 2024

Related U.S. Application Data

(63) Continuation of application No. PCT/CN2022/121916, filed on Sep. 27, 2022.

(30) Foreign Application Priority Data

Jun. 20, 2022 (CN) ......................... 202210700183.2

(51) Int. Cl.
*G09G 3/20* (2006.01)

(52) U.S. Cl.
CPC ... *G09G 3/2092* (2013.01); *G09G 2320/0233* (2013.01); *G09G 2320/0271* (2013.01); (Continued)

(58) Field of Classification Search
CPC ......... G09G 3/2092; G09G 2320/0233; G09G 2320/0271; G09G 2320/0626; G09G 2320/0673
See application file for complete search history.

(56) References Cited

U.S. PATENT DOCUMENTS

2012/0013649 A1 1/2012 Higashi et al.
2016/0140891 A1 5/2016 Lim
(Continued)

FOREIGN PATENT DOCUMENTS

CN 105741764 A 7/2016
CN 108022545 A 5/2018
(Continued)

OTHER PUBLICATIONS

Office Action issued on Jun. 17, 2025, in corresponding Chinese Application No. 202210700183.2, 7 pages.
(Continued)

*Primary Examiner* — Gene W Lee
(74) *Attorney, Agent, or Firm* — Maier & Maier, PLLC

(57) ABSTRACT

A method, apparatus, device, and storage medium for compensating a display panel. The display panel supports a first dimming mode and a second dimming mode, and the method includes: acquiring standard compensation data of the display panel under the first dimming mode and a standard display brightness value; acquiring, according to a first adjustment coefficient under the first dimming mode and a current display brightness value, a second adjustment coefficient under the second dimming mode and the current display brightness value; and determining, according to the standard compensation data and the second adjustment coefficient, target compensation data corresponding to the display panel under the second dimming mode and the current display brightness value.

18 Claims, 5 Drawing Sheets

(52) U.S. Cl.
CPC ............... *G09G 2320/0626* (2013.01); *G09G 2320/0673* (2013.01)

(56) References Cited

U.S. PATENT DOCUMENTS

| | | | | |
|---|---|---|---|---|
| 2016/0210912 | A1* | 7/2016 | Tada | G09G 3/3648 |
| 2018/0145116 | A1 | 5/2018 | Lee et al. | |
| 2018/0182298 | A1 | 6/2018 | Jang et al. | |
| 2024/0096272 | A1 | 3/2024 | Wang et al. | |

FOREIGN PATENT DOCUMENTS

| | | | |
|---|---|---|---|
| CN | 108877736 | A | 11/2018 |
| CN | 109215549 | A | 1/2019 |
| CN | 109859689 | A | 6/2019 |
| CN | 110827745 | A | 2/2020 |
| CN | 111243512 | A | 6/2020 |
| CN | 111243525 | A | 6/2020 |
| CN | 111415616 | A | 7/2020 |
| CN | 113112947 | A | 7/2021 |
| CN | 114023235 | A | 2/2022 |
| CN | 114038400 | A | 2/2022 |
| CN | 114093292 | A | 2/2022 |
| CN | 114120880 | A | 3/2022 |
| CN | 114582284 | A | 6/2022 |
| CN | 115019716 | A | 9/2022 |
| KR | 1020060113009 | A | 11/2006 |
| KR | 1020140127569 | A | 11/2014 |
| KR | 1020180042568 | A | 4/2018 |
| WO | 2021227051 | A1 | 11/2021 |

OTHER PUBLICATIONS

Office Action issued on Jun. 2, 2025, in corresponding Korean Application No. 10-2024-7018703, 6 pages.

International Search Report issued on Mar. 15, 2023, in corresponding International Patent Application No. PCT/CN2022/121916, 7 pages.

Office Action issued on Mar. 19, 2025, in corresponding Chinese Application No. 202210700183.2, 12 pages.

Office Action issued on Jan. 21, 2025, in corresponding Korean Application No. 10-2024-7018703, 11 pages.

Extended Search Report issued on Aug. 6, 2025, in corresponding European Application No. 22947634.6, 11 pages.

* cited by examiner

METHOD, APPARATUS, DEVICE, AND STORAGE MEDIUM FOR COMPENSATING DISPLAY PANEL

CROSS REFERENCE TO RELATED APPLICATION

The present application is a continuation of International Application No. PCT/CN2022/121916 filed on Sep. 27, 2022, which claims priority to Chinese Patent Application No. 202210700183.2 filed on Jun. 20, 2022, both of which are incorporated herein by reference in their entireties.

TECHNICAL FIELD

The present application relates to the field of display technology, and particularly to a method, apparatus, device, and storage medium for compensating a display panel.

BACKGROUND

With the rapid development of display technology, quantity demand for display panels from various terminals is constantly increasing, and consumers' demand for display quantity is also increasing.

In order to ensure good display quality, demura tuning is usually required for the display panel. However, with the increasing of functions of the display panel, how to achieve good compensation effect under the various functions has become a major problem for those skilled in the art.

SUMMARY

Embodiments of the present application provide a method, apparatus, device and storage medium for compensating a display panel, which can improve the compensation effect.

In a first aspect, some embodiments of the present application provide a method for compensating a display panel supporting a first dimming mode and a second dimming mode, and the method includes: acquiring standard compensation data of the display panel under the first dimming mode and a standard display brightness value; acquiring, according to a first adjustment coefficient under the first dimming mode and a current display brightness value, a second adjustment coefficient under the second dimming mode and the current display brightness value; and determining, according to the standard compensation data and the second adjustment coefficient, target compensation data corresponding to the display panel under the second dimming mode and the current display brightness value.

In a second aspect, some embodiments of the present application provide an apparatus for compensating a display panel supporting a first dimming mode and a second dimming mode, and the apparatus includes: a first data acquiring module configured to acquire standard compensation data of the display panel under the first dimming mode and a standard display brightness value; a second data acquiring module configured to acquire, according to a first adjustment coefficient under the first dimming mode and a current display brightness value, a second adjustment coefficient under the second dimming mode and the current display brightness value; and a determining module configured to determine, according to the standard compensation data and the second adjustment coefficient, target compensation data corresponding to the display panel under the second dimming mode and the current display brightness value.

In a third aspect, some embodiments of the present application further provide an electronic device including: a processor, a memory, and a program or instruction stored on the memory and executable on the processor, in which the program or instruction, when executed by the processor, implements steps of the method for compensating a display panel according to any embodiment of the first aspect.

In a fourth aspect, some embodiments of the present application provide a computer readable storage medium storing a program or instruction thereon, in which the program or instruction, when executed by a processor, implements steps of the method for compensating a display panel according to any embodiment of the first aspect.

In the method, apparatus, device and storage medium for compensating a display panel according to the embodiments of the present application, on the one hand, different dimming modes can be considered, the second adjustment coefficient under the second dimming mode is determined according to the first adjustment coefficient under the first dimming mode, and the target compensation data under the second dimming mode is determined according to the standard compensation data under the standard display brightness value and the second adjustment coefficient. In this way, when the display panel switches from the first dimming mode to the second dimming mode, the display panel can be compensated based on the target compensation data, so that the compensation is more suitable for the second dimming mode, and the compensation effect is improved. On the other hand, different display brightness values can be considered, and since the second adjustment coefficient corresponds to the current display brightness value, the obtained target compensation data is also relatively suitable for the current display brightness value, and thus the compensation effect can be further improved.

BRIEF DESCRIPTION OF THE DRAWINGS

Other features, objects and advantages of the present application will become more apparent from reading the following detailed description of the non-limiting embodiments with reference to the accompanying drawings, in which the same or similar reference numerals represent the same or similar features, and the accompanying drawings are not drawn to actual scale.

DETAILED DESCRIPTION

Figure 1:
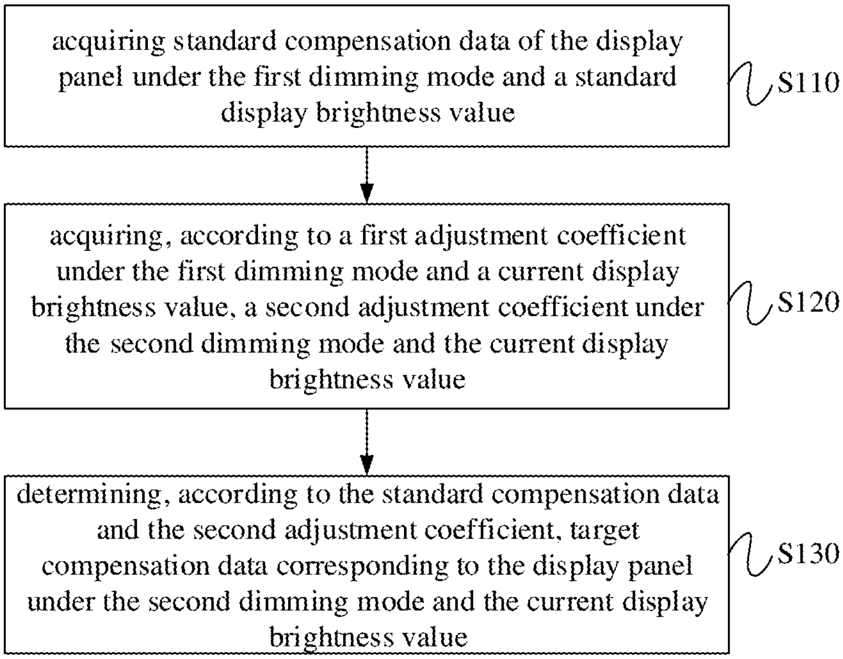
FIG. 1 shows a flowchart of a method for compensating a display panel according to an embodiment of the present application.

Features and exemplary embodiments of various aspects of the present application will be described in detail below.

In order to make the objects, technical solutions and advantages of the present application clearer, the present application is further described in detail below with reference to the accompanying drawings and specific embodiments. It should be understood that the specific embodiments described herein are only configured to explain the present application, but not to limit the present application. For those skilled in the art, the present application can be implemented without some of these specific details. The following description of the embodiments is only to provide a better understanding of the present application by illustrating examples of the present application.

Various modifications and variations can be made in the present application without departing from the gist or scope of the present application, which is apparent to those skilled in the art. Thus, the present application is intended to contemplate the modifications and variations of the present application that fall within the scope of the corresponding claims (the technical solutions claimed to be protected) and their equivalents. It should be noted that, the implementations according to the embodiments of the present application can be combined with each other without contradiction.

Before the technical solutions according to the embodiments of the present application are described, the problems in the related technology are first specified to facilitate the understanding of the embodiments of the present application.

A display panel may support a plurality of display brightness values (DBV), and brightness of the same gray scale image under different display brightness values are different. For example, the display brightness value may be understood as a display brightness level, and taking a cellular phone as an example, the cellular phone is provided with a brightness bar, and different positions on the brightness bar may represent different display brightness values. When demura compensation tuning is performed, the tuning is necessary for each display brightness value. In addition, the display panel may support a plurality of dimming modes. The inventor has found that gamma values corresponding to different dimming modes are different, while the compensation data is generated according to the gamma value, and thus if the different dimming modes use the same compensation data, especially for a low display brightness value or a low gray scale, the compensation effect is not ideal.

In order to solve the above technical problems, the embodiments of the present application provide a method, apparatus, device and storage medium for compensating a display panel, which will be described below with reference to the accompanying drawings.

In the embodiments of the present application, the display panel may support a plurality of dimming modes. In order to better understand the dimming mode, Table 1 and Table 2 are given as examples, in which Table 1 illustrates the dimming mode A, and Table 2 illustrates the dimming mode B.

TABLE 1

| | | Source dimming area | | | | | |
|---|---|---|---|---|---|---|---|
| | | 500 nit | | | 120 nit | | |
| | | DBV | | | | | |
| | | 07FF | | | 03BF | | |
| | Gray | R | G | B | R | G | B |
| dimming mode A | 1 | 0 | 0 | 0 | 0 | 0 | 0 |
| | 15 | 292 | 246 | 320 | 243 | 204 | 273 |
| | 63 | 462 | 400 | 501 | 372 | 320 | 407 |
| | 207 | 726 | 622 | 773 | 556 | 484 | 599 |
| | 255 | 808 | 687 | 858 | 601 | 522 | 645 |

TABLE 2

| | | Source dimming area 500 nit | | | EM dimming area 120 nit | | |
|---|---|---|---|---|---|---|---|
| | | DBV | | | | | |
| | | 07FF | | | 03BF | | |
| | Gray | R | G | B | R | G | B |
| dimming mode B | 1 | 0 | 0 | 0 | 0 | 0 | 0 |
| | 15 | 292 | 246 | 320 | 264 | 224 | 303 |
| | 63 | 462 | 400 | 501 | 414 | 356 | 454 |
| | 207 | 726 | 622 | 773 | 619 | 538 | 669 |
| | 255 | 808 | 687 | 858 | 672 | 581 | 720 |

Herein, 500 nit, 120 nit, and the like represent brightness corresponding to different display brightness values, 07FF represents a dimming register value corresponding to the display brightness value 500 nit, and 03BF represents a dimming register value corresponding to the display brightness value 120 nit. In the Tables, for example, the gray scale range of the display panel is from 0 to 255, and gray scale 0 is not shown. In addition, taking 292 corresponding to gray scale 15 as an example, 292 represents a gamma value under a condition that the display brightness value is 500 nit and R sub-pixel is under gray scale 15.

For example, the dimming mode A may include a Source dimming area, without an EM dimming area, and the dimming mode B may include the Source dimming area and the EM dimming area. The Source dimming may be understood as adjusting brightness by changing a data voltage, and the EM dimming may be understood as adjusting brightness by changing the duty ratio of a light emitting control signal which may control the sub-pixel to enter a light emitting stage. In the dimming mode A, the Source dimming is used for each display brightness value, while in the dimming mode B, the Source dimming is used for a display brightness value greater than 120 nit, and the EM dimming is used for a display brightness value less than or equal to 120 nit.

As shown in FIG. 1, the method for compensating a display panel according to the embodiments of the present application may include steps S110 to S130.

S110: acquiring standard compensation data of the display panel under the first dimming mode and a standard display brightness value.

S120: acquiring, according to a first adjustment coefficient under the first dimming mode and a current display brightness value, a second adjustment coefficient under the second dimming mode and the current display brightness value.

S130: determining, according to the standard compensation data and the second adjustment coefficient, target compensation data corresponding to the display panel under the second dimming mode and the current display brightness value.

It should be noted that, the above description does not limit the execution order of S110 and S120, and S110 may be executed at the same time with, before, or after S120.

Specific implementations of the above steps will be described in detail below.

In the method for compensating a display panel according to the embodiments of the present application, on the one hand, the different dimming modes can be considered, the second adjustment coefficient under the second dimming mode is determined according to the first adjustment coefficient under the first dimming mode, and the target compensation data under the second dimming mode is determined according to the standard compensation data under the standard display brightness value and the second adjustment coefficient. In this way, when the display panel switches from the first dimming mode to the second dimming mode, the display panel can be compensated based on the target compensation data, so that the compensation is more suitable for the second dimming mode, and the compensation effect is improved. On the other hand, different display brightness values can be considered, and since the second adjustment coefficient corresponds to the current display brightness value, the obtained target compensation data is also relatively suitable for the current display brightness value, and thus the compensation effect can be further improved.

In an example, the steps S110 to S130 may be executed under a condition that the display panel has switched from the first dimming mode to the second dimming mode, then in the execution of the steps S110 to S130, the current dimming mode is the second dimming mode. Specifically, the method for compensating a display panel according to the embodiments of the present application may further include, before S110, obtaining the current dimming mode of the display panel. Under a condition that the current dimming mode is switched from the first dimming mode to the second dimming mode, the steps S110 to S130 are executed.

In an example, the first dimming mode may be the above dimming mode A and the second dimming mode may be the above dimming mode B, or the first dimming mode may be the above dimming mode B and the second dimming mode may be the above dimming mode A.

In an example, the demura compensation tuning may be performed on the display panel before the display panel leaves factory. For example, the display panel is in the first dimming mode, the standard compensation data of the display panel under the first dimming mode and the standard display brightness value is determined and stored in a memory of the display panel, so that the standard compensation data can be directly called when the display panel is compensated, and in S110, the standard compensation data can be read from the memory of the display panel.

In an example, the standard compensation data may include specific standard compensation gray scale values.

In an example, besides that the second adjustment coefficient is obtained according to the first adjustment coefficient, the second adjustment coefficient may be determined according to gamma values under different dimming modes, which will be described in detail below.

Figure 2:
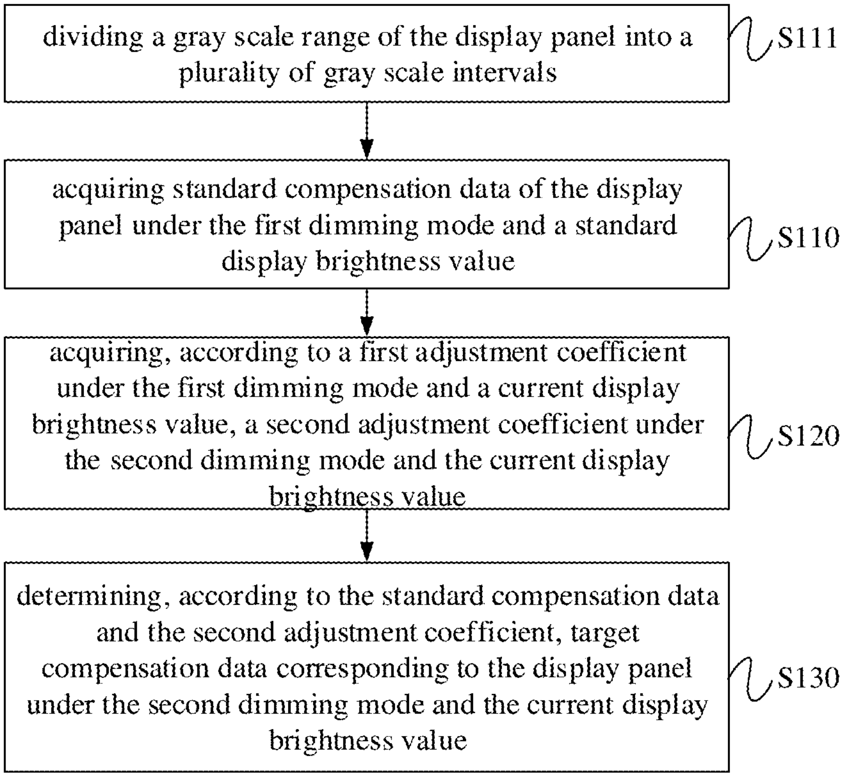
FIG. 2 shows a flowchart of a method for compensating a display panel according to an embodiment of the present application.

The gray scales that can be displayed by the display panel are in a certain range. A display panel of 8 bit is given as an example, the gray scale range of the display panel is from 0 to 255, and gamma values corresponding to different gray scales under the same display brightness value (DBV) are different. In some optional embodiments, the gray scale range of the display panel is divided into a plurality of gray scale intervals. Specifically, the gray scale range may be divided into the plurality of gray scale intervals in advance, so that the gray scale range needs not to be re-divided each time the method for compensating a display panel is executed or when the method for compensating a display panel is executed. For example, as shown in FIG. 2, the method for compensating a display panel according to the embodiments of the present application may further include S111: dividing a gray scale range of the display panel into a plurality of gray scale intervals. For example, the gray scales 0 to 255 may be divided into four gray scale intervals, in which a gray scale interval x0 corresponds to gray scales 0 to 14, a gray scale interval x1 corresponds to gray scales 15 to 63, a gray scale interval x2 corresponds to gray scales 64 to 207, and a gray scale interval x3 corresponds to gray scales 208 to 255. The number of gray scale intervals is not limited to be four, and may be, for example, five, six, and the like. It should be understood that the greater the number of the gray scale intervals, the more accurate the compensation. Sometimes for the maximum accuracy, each gray scale interval may include only one gray scale value, and for example, the gray scales 0 to 255 may be divided into 256 gray scale intervals.

Correspondingly, the standard compensation data may include a plurality of compensation data of the display panel respectively corresponding to the gray scale intervals under the first dimming mode and the standard display brightness value.

The first adjustment coefficient may include a plurality of adjustment coefficients respectively corresponding to the gray scale intervals under the current display brightness value and the first dimming mode, the second adjustment coefficient may include a plurality of other adjustment coefficients respectively corresponding to the gray scale intervals under the current display brightness value and the second dimming mode, and the target compensation data may include a plurality of compensation data of the display panel respectively corresponding to the gray scale intervals under the second dimming mode and the current display brightness value. By dividing the gray scale range into the gray scale intervals, when the display compensation is performed, each gray scale interval may be compensated using the corresponding target compensation data, thereby further improving the compensation effect.

The display panel may include sub-pixels of a plurality of colors, for example, the display panel includes red sub-pixels R, green sub-pixels G, and blue sub-pixels B, then the standard compensation data may include compensation data respectively corresponding to the sub-pixels of various colors under each gray scale interval, the first adjustment coefficient and the second adjustment coefficient may respectively include a plurality of adjustment coefficients respectively corresponding to the sub-pixels of various colors under each gray scale interval, and the target compensation data may include compensation data respectively corresponding to the sub-pixels of various colors under each gray scale interval.

Figure 3:
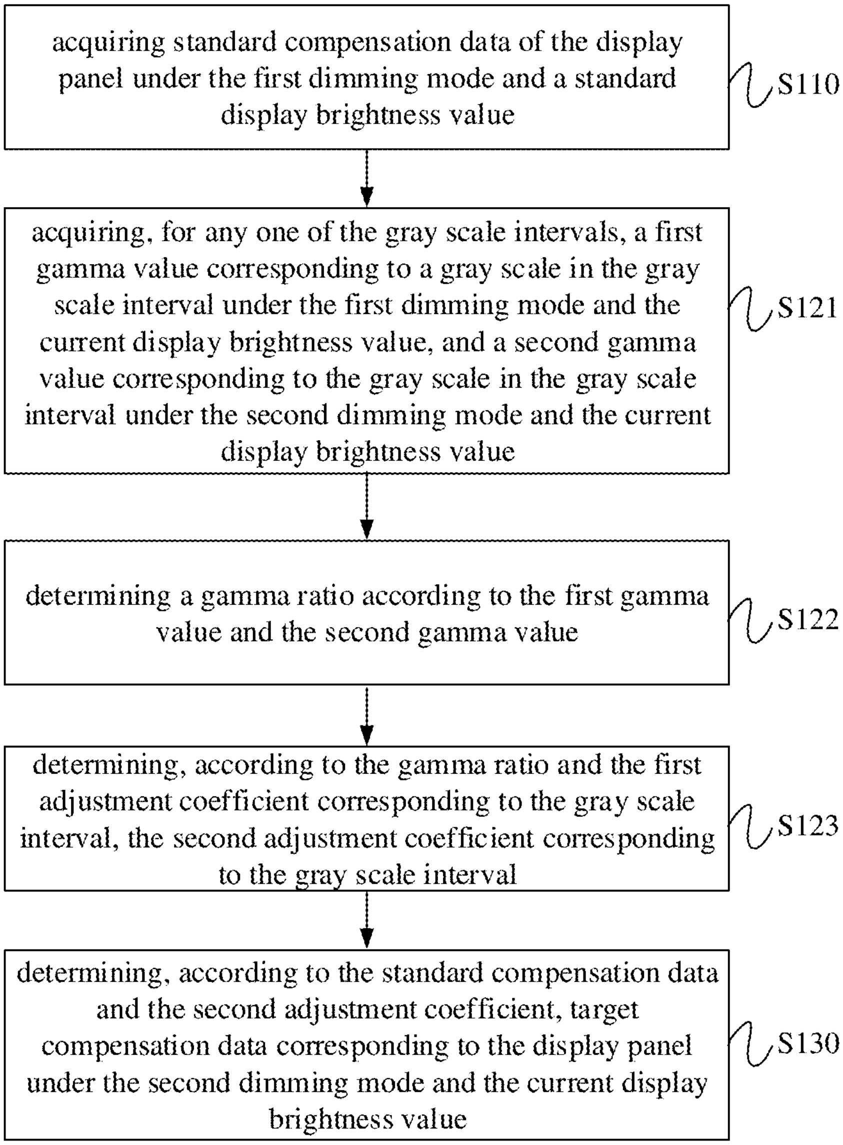
FIG. 3 shows a flowchart of a method for compensating a display panel according to an embodiment of the present application.

In an example, as described above, the second adjustment coefficient may be determined according to the first adjustment coefficient and the gamma values under different dimming modes, and in some optional embodiments, under a condition that the display panel includes a plurality of gray scale intervals, S120 may specifically include steps S121 to S123, as shown in FIG. 3.

S121: acquiring, for any one of the gray scale intervals, a first gamma value corresponding to a gray scale in the gray scale interval under the first dimming mode and the current display brightness value, and a second gamma value corresponding to the gray scale in the gray scale interval under the second dimming mode and the current display brightness value.

S122: determining, according to the first gamma value and the second gamma value, a gamma ratio for switching from the first dimming mode to the second dimming mode. In an example, the gamma ratio may be a ratio of the gamma values or a ratio of gamma value differences.

S123: determining, according to the gamma ratio and the first adjustment coefficient corresponding to the gray scale interval, the second adjustment coefficient corresponding to the gray scale interval.

Specific implementations of the steps S121 to S123 will be described in detail below.

According to the embodiments of the present application, on the one hand, since the gamma value affects the light emitting brightness of the pixel, the difference between different dimming modes is directly reflected by the gamma value, in the embodiments of the present application, the gamma ratio is determined according to the gamma value differences under different dimming modes, and the second adjustment coefficient under the second dimming mode is determined based on the gamma ratio, so that the adjustment coefficients can be more accurate; on the other hand, in the embodiments of the present application, the display panel may dynamically determine the second adjustment coefficient under the second dimming mode during display, so that the adjustment coefficients need not to predetermined and stored before the display panel leaves factory, and thus the time required for performing demura tuning on the display panel is shortened, and the manufacturing efficiency of the display panel can be improved; further, compared with the situation in which the compensation data corresponding to various dimming modes are respectively determined and stored before the display panel leaves factory, in the embodiments of the present application, the compensation data corresponding to the second dimming mode need not to be stored, and thus the required storage space can be reduced, thereby reducing cost; and still further, in determining the adjustment coefficients, the gamma value under the current display brightness value is obtained and calculated, and thus the calculation speed can be increased.

In an example, the gamma value may be understood as the value of a gamma register corresponding to each gray scale after gamma tuning has been performed on the display panel. The gamma value may be stored in a memory corresponding to the display panel in advance.

For example, the first gamma value may include a first sub-gamma value and a second sub-gamma value, in which the first sub-gamma value may be a gamma value corresponding to a first gray scale in the gray scale interval under the first dimming mode and the current display brightness value, and the second sub-gamma value may be a gamma value corresponding to a second gray scale in the gray scale interval under the first dimming mode and the current display brightness value.

The second gamma value may include a third sub-gamma value and a fourth sub-gamma value, in which the third sub-gamma value may be a gamma value corresponding to the first gray scale in the gray scale interval under the second dimming mode and the current display brightness value, and the fourth sub-gamma value may be a gamma value corresponding to the second gray scale in the gray scale interval under the second dimming mode and the current display brightness value.

Herein, the first gray scale may be the maximum gray scale in the gray scale interval, and the second gray scale may be the minimum gray scale in the gray scale interval. The first gray scale and the second gray scale are not specifically limited herein, provided that the first gray scale and the second gray scale can generally reflect the gray scale interval.

In the embodiments of the present application, since the first gray scale and the second gray scale in the gray scale interval can generally reflect the gray scale range of the gray scale interval, the gamma values corresponding to the first gray scale and the second gray scale reflect the gamma value range corresponding to the gray scale interval, so that each gray scale in the gray scale interval can be considered, thereby ensuring that the obtained adjustment coefficients are suitable for each gray scale in the gray scale interval.

As another example, the first gamma value may include a plurality of gamma values respectively corresponding to a plurality of gray scales in the gray scale interval under the first dimming mode and the current display brightness value, and the second gamma value may include a plurality of other gamma values respectively corresponding to the plurality of gray scales in the gray scale interval under the second dimming mode and the current display brightness value. It should be noted that, the plurality of gray scales herein are not limited, and the plurality of gray scales in the gray scale interval may be a plurality of gray scales uniformly distributed in the gray scale interval, and the plurality of gray scales in the gray scale interval may further include each gray scale in the gray scale interval.

In some optional embodiments, S123 may specifically include: calculating a product of the gamma ratio and the first adjustment coefficient corresponding to the gray scale interval to obtain the second adjustment coefficient corresponding to the gray scale interval. Specifically, the product of the gamma ratio and the first adjustment coefficient corresponding to the gray scale interval may be determined as the second adjustment coefficient corresponding to the gray scale interval. The second adjustment coefficient may be specifically calculated using the following equation:

$$fs\_2 = fs\_1 \times k,$$

where fs_2 represents the second adjustment coefficient; fs_1 represents the first adjustment coefficient; and k represents the gamma ratio.

In some optional embodiments, S122 may specifically include: determining the gamma ratio according to the following equation (1) or (2):

$$k = \left|\frac{\Delta\text{gamma2}}{\Delta\text{ gamma1}}\right|, \tag{1}$$

$$k = \frac{\overline{\text{gamma2}}}{\overline{\text{gamma1}}}, \tag{2}$$

where k represents the gamma ratio, Δgamma1 represents a difference between the first sub-gamma value and the second sub-gamma value, and Δgamma2 represents a difference between the third sub-gamma value and the fourth sub-gamma value; and $\overline{\text{gamma1}}$ represents an average value of gamma values respectively corresponding to a plurality of gray scales in the gray scale interval under the first dimming mode and the current display brightness value, and $\overline{\text{gamma2}}$ represents an average value of gamma values respectively corresponding to the plurality of gray scales in the gray scale interval under the second dimming mode and the current display brightness value.

According to the equation (2) in the embodiments of the present application, the average value of the gamma values respectively corresponding to the plurality of gray scales in the gray scale interval is used, so that the plurality of gray scales in the gray scale interval can be considered, thereby ensuring that the obtained adjustment coefficients are suitable for the plurality of gray scales in the gray scale interval.

Figure 4:
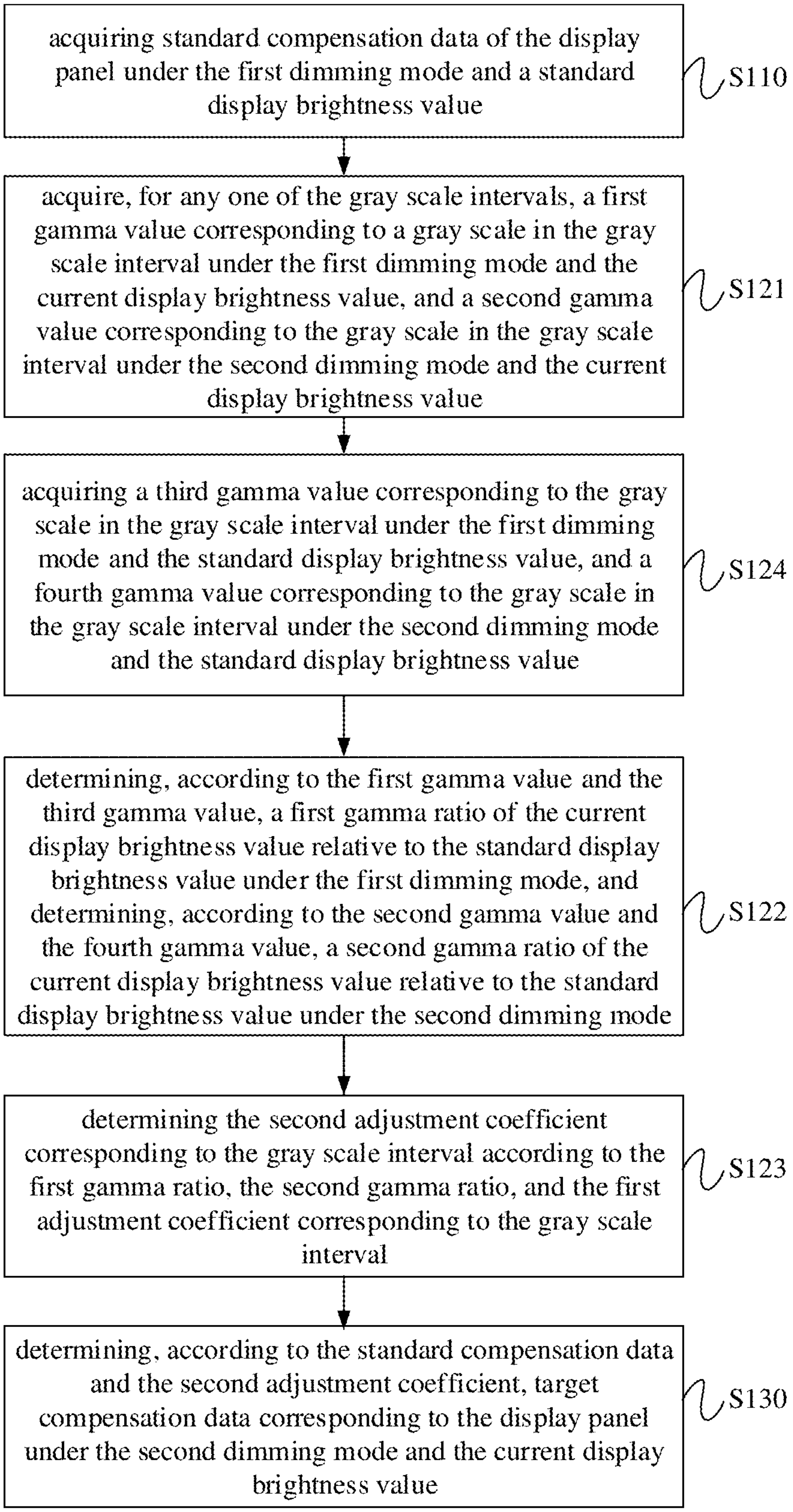
FIG. 4 shows a flowchart of a method for compensating a display panel according to an embodiment of the present application.

In some optional embodiments, as shown in FIG. 4, the method for compensating a display panel according to the embodiments of the present application may further include S124, which may be before S122. S124: acquiring a third gamma value corresponding to the gray scale in the gray scale interval under the first dimming mode and the standard display brightness value, and a fourth gamma value corresponding to the gray scale in the gray scale interval under the second dimming mode and the standard display brightness value.

Accordingly, S122 may specifically include: determining, according to the first gamma value and the third gamma value, a first gamma ratio of the current display brightness value relative to the standard display brightness value under the first dimming mode, and determining, according to the second gamma value and the fourth gamma value, a second gamma ratio of the current display brightness value relative to the standard display brightness value under the second dimming mode.

S123 may specifically include: determining the second adjustment coefficient corresponding to the gray scale interval according to the first gamma ratio, the second gamma ratio, and the first adjustment coefficient corresponding to the gray scale interval.

The inventor has found that under a condition that the display brightness value is great, the gamma values under different dimming modes may be the same or different. As shown in Table 1 and Table 2, under a condition that the display brightness value is greater than 120 nit, the gamma values under the two dimming modes are the same. Thus, if the brightness corresponding to the standard display brightness is relatively great (for example, the standard display brightness is the maximum display brightness of the display panel), the gamma value corresponding to the standard display brightness may not be considered when determining the second adjustment coefficient, and for example, the second adjustment coefficient may be determined based on the gamma ratio determined by the above equation (1) or (2). Moreover, if the display brightness value is great, for the condition that the gamma values under different dimming modes are different, the second adjustment coefficient may be determined further according to the standard display brightness value as provided in the embodiments of the present application, so that the accuracy of the adjustment coefficients can be increased.

In an example, the standard display brightness value may be one of a plurality of display brightness values of the display panel. In gamma tuning and demura tuning, optical instruments are used to collect the brightness, color coordinate, and the like displayed by the display panel. Due to the stability, accuracy, and the like of the optical instruments, the values collected by the optical instruments under high brightness are relatively more accurate, and in order to ensure the accuracy of the obtained adjustment coefficients, the standard display brightness value may be the maximum display brightness value of the display panel.

An example is given, in which the first dimming mode is the dimming mode A shown in Table 1, the second dimming mode is the dimming mode B shown in Table 2, the current display brightness value is 120 nit, and the standard display brightness value is 500 nit. For the red sub-pixel R in the gray scale interval x1 (gray scales 15 to 63), in S112, the gamma values respectively corresponding the gray scales 15 to 63 under the two dimming modes, as well as the current display brightness value and the standard display brightness value, may be read from the memory. For example, in the dimming mode A, the gamma value corresponding to the gray scale 15 under the current display brightness value 120 nit is 243, and the gamma value corresponding to the gray scale 15 under the standard display brightness value 500 nit is 292; and in the dimming mode B, the gamma value corresponding to the gray scale 15 under the current display brightness value 120 nit is 264, and the gamma value corresponding to the gray scale 15 under the standard display brightness value 500 nit is 292.

For example, the third gamma value may include a fifth sub-gamma value and a sixth sub-gamma value, the fifth sub-gamma value may be a gamma value corresponding to a first gray scale in the gray scale interval under the first dimming mode and the standard display brightness value, and the sixth sub-gamma value may be a gamma value corresponding to a second gray scale in the gray scale interval under the first dimming mode and the standard display brightness value.

The fourth gamma value may include a seventh sub-gamma value and an eighth sub-gamma value, the seventh sub-gamma value may be a gamma value corresponding to the first gray scale in the gray scale interval under the second dimming mode and the standard display brightness value, and the eighth sub-gamma value may be a gamma value corresponding to the second gray scale in the gray scale interval under the second dimming mode and the standard display brightness value.

Similarly, since the first gray scale and the second gray scale in the gray scale interval can generally reflect the gray scale range of the gray scale interval, the gamma values corresponding to the first gray scale and the second gray scale reflect the gamma value range corresponding to the gray scale interval, so that each gray scale in the gray scale interval can be considered, thereby ensuring that the obtained adjustment coefficients are suitable for each gray scale in the gray scale interval.

As another example, the third gamma value may include a plurality of gamma values respectively corresponding to a plurality of gray scales in the gray scale interval under the first dimming mode and the standard display brightness value, and the fourth gamma value may include a plurality of other gamma values respectively corresponding to the plurality of gray scales in the gray scale interval under the second dimming mode and the standard display brightness value.

In some optional embodiments, S122 may specifically include determining the first gamma ratio and the second gamma ratio according to the following equation (3):

$$k1 = \left|\frac{\Delta\,\text{gamma1}}{\Delta\,\text{gamma1}}\right| \tag{3}$$

-continued and $$k2=\left|\frac{\Delta\text{gamma2}}{\Delta\text{gamma02}}\right|,$$

where k1 represents the first gamma ratio, k2 represents the second gamma ratio, Δgamma1 represents a difference between the first sub-gamma value and the second sub-gamma value, and Δgamma2 represents a difference between the third sub-gamma value and the fourth sub-gamma value; Δgamma01 represents a difference between the fifth sub-gamma value and the sixth sub-gamma value, and Δgamma02 represents a difference between the seventh sub-gamma value and the eighth sub-gamma value.

In an example, the above example is still considered, in which the first dimming mode is the dimming mode A shown in Table 1, the second dimming mode is the dimming mode B shown in Table 2, the current display brightness value is 120 nit, and the standard display brightness value is 500 nit. For the red sub-pixel R in the gray scale interval x1 (gray scales 15 to 63), Δgamma1=372−243, Δgamma01=462−292, Δgamma2=414−264, and Δgamma02=462−292, and thus the first gamma ratio k1 and the second gamma ratio k2 can be calculated.

In some optional embodiments, S112 may specifically include determining the first gamma ratio and the second gamma ratio according to the following equation (4):

$$k1=\frac{\overline{\text{gamma1}}}{\overline{\text{gamma01}}} \tag{4}$$

and $$k2=\frac{\overline{\text{gamma2}}}{\overline{\text{gamma02}}},$$

where $\overline{\text{gamma1}}$ represents an average value of gamma values respectively corresponding to a plurality of gray scales in the gray scale interval under the first dimming mode and the current display brightness value, $\overline{\text{gamma01}}$ represents an average value of gamma values respectively corresponding to the plurality of gray scales in the gray scale interval under the first dimming mode and the standard display brightness value, $\overline{\text{gamma2}}$ represents an average value of gamma values respectively corresponding to the plurality of gray scales in the gray scale interval under the second dimming mode and the current display brightness value, and $\overline{\text{gamma02}}$ represents an average value of gamma values respectively corresponding to the plurality of gray scales in the gray scale interval under the second dimming mode and the standard display brightness value. It should be noted that, the plurality of gray scales herein are not limited, and the plurality of gray scales in the gray scale interval may be a plurality of gray scales uniformly distributed in the gray scale interval, and the plurality of gray scales in the gray scale interval may further include each gray scale in the gray scale interval.

Similarly, according to the equation (4) in the embodiments of the present application, the average value of the gamma values respectively corresponding to the plurality of gray scales in the gray scale interval is used, so that the plurality of gray scales in the gray scale interval can be considered, thereby ensuring that the obtained adjustment coefficients are suitable for the plurality of gray scales in the gray scale interval.

The above example is still considered, in which the first dimming mode is the dimming mode A shown in Table 1, the second dimming mode is the dimming mode B shown in Table 2, the current display brightness value is 120 nit, and the standard display brightness value is 500 nit. For the red sub-pixel R in the gray scale interval x1 (gray scales 15 to 63), the gamma values respectively corresponding to gray scales 15 to 63 of the red sub-pixel R under the first dimming mode and the current display brightness value may be obtained firstly, and then the sum of these gamma values are divided by the number of the gray scales in the gray scale interval to obtain $\overline{\text{gamma1}}$. Similarly, gamma01, $\overline{\text{gamma2}}$, and gamma02 may be determined in the way as $\overline{\text{gamma1}}$, and thus the first gamma ratio k1 and the second gamma ratio k2 can be calculated.

Further, S123 may specifically include: determining the second adjustment coefficient corresponding to the gray scale interval according to a ratio of the second gamma ratio to the first gamma ratio and the first adjustment coefficient corresponding to the gray scale interval. For example, the ratio of the second gamma ratio to the first gamma ratio may be calculated, and a product of the ratio and the first adjustment coefficient corresponding to the gray scale interval may be calculated and determined as the second adjustment coefficient corresponding to the gray scale interval. Specifically, the second adjustment coefficient may be calculated according to the following equation:

$$\text{fs\_2}=\text{fs\_1}\times\frac{k2}{k1},$$

where fs_2 represents the second adjustment coefficient; fs_1 represents the first adjustment coefficient; k1 represents the first gamma ratio; and k2 represents the second gamma ratio.

For example, k1 and k2 are determined according to the above equation (3), then for the gray scale interval (gray scales 15 to 63), the second adjustment coefficient corresponding to the red sub-pixel R under the second dimming mode and the current display brightness value (120 nit) may be a ratio of (414−264) to (372−243).

Figure 5:
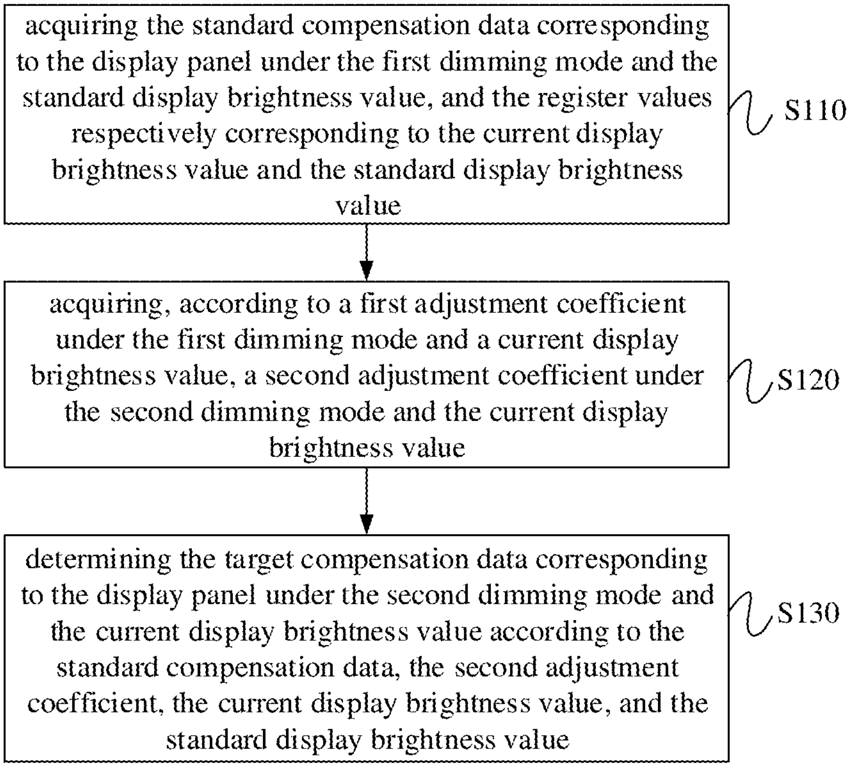
FIG. 5 shows a flowchart of a method for compensating a display panel according to an embodiment of the present application.

In some optional embodiments, as shown in FIG. 5, S130 may specifically include: determining the target compensation data corresponding to the display panel under the second dimming mode and the current display brightness value according to the standard compensation data, the second adjustment coefficient, the current display brightness value, and the standard display brightness value.

Specifically, the target compensation data corresponding to any one of the gray scale intervals is determined according to the following equation (5):

$$M1=M0\times\frac{DBVn}{DBV0}\times\text{fs\_2}, \tag{5}$$

where M1 represents the target compensation data, M0 represents the standard compensation data of the display panel under the first dimming mode and the standard display brightness value, DBVn represents a register value corresponding to the current display brightness value, DBV0 represents a register value corresponding to the standard display brightness value, and fs_2 represents the second adjustment coefficient.

M0 may be stored in the memory corresponding to the display panel in advance. In an example, when the demura tuning is performed on the display panel, M0 corresponding to each gray scale interval may be determined under the first dimming mode and the standard display brightness value and stored into the memory corresponding to the display panel.

In an example, the initial value of the first adjustment coefficient may be manually set by a technician during the tuning and fixed into the algorithm, and the first adjustment coefficient may be an adjustment coefficient calculated during the previous dimming mode switch. It should be noted that, both the first adjustment coefficient and the second adjustment coefficient are coefficients for performing demura compensation on the display panel.

For example, the first adjustment coefficient of the current display brightness value relative to the standard display brightness value under the first dimming mode may be predetermined. As shown in Table 3, the display brightness values of the display panel may include DBV0 to DBV5, and the gray scale intervals of the display panel may include Gray0 to Gray4. The specific value of Gray0 to Gray4 may be a gray scale value in each gray scale interval of the display panel. In an example where the standard display brightness value is DBV0, the current display brightness value may be any one of DBV1 to DBV5 in Table 3. The specific value Gain [7:0] of the first adjustment coefficients respectively corresponding to the gray scale intervals under each display brightness value and the first dimming mode may be determined, in which the bit number of the gray scale of the display panel may be 8 bit, the gray scale range may be from 0 to 255, and Gain [7:0] represents the value of the first adjustment coefficient corresponding to one of the gray scales 0 to 255. It may be understood that, under DBV0, the values of the first adjustment coefficients respectively corresponding to Gray0 to Gray4 may all be 1.

TABLE 3

| | Gray0 | Gray1 | Gray2 | Gray3 | Gray4 |
|---|---|---|---|---|---|
| DBV0 | Gain[7:0] | Gain[7:0] | Gain[7:0] | Gain[7:0] | Gain[7:0] |
| DBV1 | Gain[7:0] | Gain[7:0] | Gain[7:0] | Gain[7:0] | Gain[7:0] |
| DBV2 | Gain[7:0] | Gain[7:0] | Gain[7:0] | Gain[7:0] | Gain[7:0] |
| DBV3 | Gain[7:0] | Gain[7:0] | Gain[7:0] | Gain[7:0] | Gain[7:0] |
| DBV4 | Gain[7:0] | Gain[7:0] | Gain[7:0] | Gain[7:0] | Gain[7:0] |
| DBV5 | Gain[7:0] | Gain[7:0] | Gain[7:0] | Gain[7:0] | Gain[7:0] |

In an example, M0 may be a specific value, and for example, M0 is a compensated gray scale value.

The above example is still considered, in which the current display brightness value is 120 nit, as shown in Table 1 or Table 2, DBVn=03BF, which is hexadecimal, the register value may be converted from hexadecimal to decimal in the calculation of equation (5), and the same applies to DBV0.

As described above, due to the stability, accuracy, and the like of the optical instruments, the values collected by the optical instruments under high brightness are relatively more accurate, and in order to ensure the accuracy of the obtained target compensation data, the standard display brightness value in any one of the above embodiments may be the maximum display brightness value of the display panel.

In addition, the inventor obtained the data shown in Table 4 through a simulation on the display panel.

TABLE 4

| | Gray | first adjustment coefficient corresponding to dimming mode B | second adjustment coefficient corresponding to dimming mode A |
|---|---|---|---|
| x1 | R_x1 | 0.736 | 0.899 |
| | G_x1 | 0.672 | 0.820 |
| | B_x1 | 0.732 | 0.860 |
| x2 | R_x2 | 0.667 | 0.752 |
| | G_x2 | 0.707 | 0.785 |
| | B_x2 | 0.678 | 0.762 |
| x3 | R_x3 | 0.526 | 0.603 |
| | G_x3 | 0.548 | 0.645 |
| | B_x3 | 0.537 | 0.610 |

Table 4 illustrates the first adjustment coefficients and the second adjustment coefficients respectively corresponding to the gray scale intervals x1 to x3, the sub-pixels R, the sub-pixels G, and the sub-pixels B. The above example is still considered, in which the dimming mode B is the first dimming mode, and the dimming mode A is the second dimming mode. For example, under a condition that the ratio of the second adjustment coefficient to the first adjustment coefficient represents an adjustment coefficient variation, the adjustment coefficient variation of the sub-pixels R in the gray scale interval x1 is equal to 0.899/0.736, which is approximately 122%. It may be seen that the variation of the second adjustment coefficient with respect to the first adjustment coefficient is relatively great. Moreover, under the dimming mode A, the display panel is compensated based on the first adjustment coefficient and the second adjustment coefficient, respectively, and the compensation effect of the first adjustment coefficient on the display panel under the dimming mode A is not ideal, while the compensation effect of the second adjustment coefficient on the display panel under the dimming mode A may satisfy the requirements.

Figure 6:
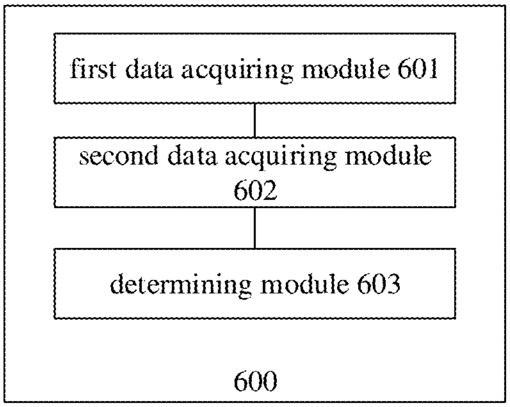
FIG. 6 shows a schematic structural diagram of an apparatus for compensating a display panel according to an embodiment of the present application.

The embodiments of the present application further provide an apparatus for compensating a display panel supporting a first dimming mode and a second dimming mode. As shown in FIG. 6, an apparatus 600 for compensating a display panel includes a first data acquiring module 601, a second data acquiring module 602, and a determining module 603.

The first data acquiring module 601 is configured to acquire standard compensation data of the display panel under the first dimming mode and a standard display brightness value.

The second data acquiring module 602 is configured to acquire, according to a first adjustment coefficient under the first dimming mode and a current display brightness value, a second adjustment coefficient under the second dimming mode and the current display brightness value.

The determining module 603 is configured to determine, according to the standard compensation data and the second adjustment coefficient, target compensation data corresponding to the display panel under the second dimming mode and the current display brightness value.

In the apparatus for compensating a display panel according to the embodiments of the present application, on the one hand, the different dimming modes can be considered, the second adjustment coefficient under the second dimming mode is determined according to the first adjustment coefficient under the first dimming mode, and the target compensation data under the second dimming mode is determined according to the standard compensation data under the standard display brightness value and the second adjustment coefficient. In this way, when the display panel switches from the first dimming mode to the second dimming mode, the display panel can be compensated based on the target compensation data, so that the compensation is more suitable for the second dimming mode, and the compensation effect is improved. On the other hand, different display brightness values can be considered, and since the second adjustment coefficient corresponds to the current display brightness value, the obtained target compensation data is also relatively suitable for the current display brightness value, and thus the compensation effect can be further improved.

In some optional embodiments, the gray scale range of the display panel is divided into the plurality of gray scale intervals.

Accordingly, the first adjustment coefficient includes a plurality of adjustment coefficients respectively corresponding to the gray scale intervals under the current display brightness value and the first dimming mode, the second adjustment coefficient includes a plurality of other adjustment coefficients respectively corresponding to the gray scale intervals under the current display brightness value and the second dimming mode, and the target compensation data includes a plurality of compensation data of the display panel respectively corresponding to the gray scale intervals under the second dimming mode and the current display brightness value.

In some optional embodiments, the second data acquiring module 602 may be specifically configured to: acquire, for any one of the gray scale intervals, a first gamma value corresponding to a gray scale in the gray scale interval under the first dimming mode and the current display brightness value, and a second gamma value corresponding to the gray scale in the gray scale interval under the second dimming mode and the current display brightness value; determine, according to the first gamma value and the second gamma value, a gamma ratio for switching from the first dimming mode to the second dimming mode; and determine, according to the gamma ratio and the first adjustment coefficient corresponding to the gray scale interval, the second adjustment coefficient corresponding to the gray scale interval.

Optionally, the first gamma value includes a first sub-gamma value and a second sub-gamma value, in which the first sub-gamma value is a gamma value corresponding to a first gray scale in the gray scale interval under the first dimming mode and the current display brightness value, and the second sub-gamma value is a gamma value corresponding to a second gray scale in the gray scale interval under the first dimming mode and the current display brightness value; and the second gamma value includes a third sub-gamma value and a fourth sub-gamma value, in which the third sub-gamma value is a gamma value corresponding to the first gray scale in the gray scale interval under the second dimming mode and the current display brightness value, and the fourth sub-gamma value is a gamma value corresponding to the second gray scale in the gray scale interval under the second dimming mode and the current display brightness value.

Alternatively, the first gamma value includes a plurality of gamma values respectively corresponding to a plurality of gray scales in the gray scale interval under the first dimming mode and the current display brightness value, and the second gamma value includes a plurality of other gamma values respectively corresponding to the plurality of gray scales in the gray scale interval under the second dimming mode and the current display brightness value.

In some optional embodiments, the determining module 603 may be specifically configured to: calculate a product of the gamma ratio and the first adjustment coefficient corresponding to the gray scale interval to obtain the second adjustment coefficient corresponding to the gray scale interval.

In some optional embodiments, the second data acquiring module 602 may be specifically configured to: determine the gamma ratio according to the following equation (1) or (2):

$$k = \left|\frac{\Delta\,\text{gamma2}}{\Delta\,\text{gamma1}}\right|, \tag{1}$$

$$k = \frac{\overline{\text{gamma2}}}{\overline{\text{gamma1}}}, \tag{2}$$

where k represents the gamma ratio, Δgamma1 represents a difference between the first sub-gamma value and the second sub-gamma value, and Δgamma2 represents a difference between the third sub-gamma value and the fourth sub-gamma value; and $\overline{\text{gamma1}}$ represents an average value of gamma values respectively corresponding to a plurality of gray scales in the gray scale interval under the first dimming mode and the current display brightness value, and $\overline{\text{gamma2}}$ represents an average value of gamma values respectively corresponding to the plurality of gray scales in the gray scale interval under the second dimming mode and the current display brightness value.

In some optional embodiments, the second data acquiring module 602 may be specifically configured to: acquire a third gamma value corresponding to the gray scale in the gray scale interval under the first dimming mode and the standard display brightness value, and a fourth gamma value corresponding to the gray scale in the gray scale interval under the second dimming mode and the standard display brightness value; and determine, according to the first gamma value and the third gamma value, a first gamma ratio of the current display brightness value relative to the standard display brightness value under the first dimming mode, and determine, according to the second gamma value and the fourth gamma value, a second gamma ratio of the current display brightness value relative to the standard display brightness value under the second dimming mode.

In some optional embodiments, the determining module 603 may be specifically configured to: determine the second adjustment coefficient corresponding to the gray scale interval according to the first gamma ratio, the second gamma ratio, and the first adjustment coefficient corresponding to the gray scale interval.

Optionally, the standard display brightness value includes the maximum display brightness value of the display panel.

Optionally, the third gamma value includes a fifth sub-gamma value and a sixth sub-gamma value, the fifth sub-gamma value is a gamma value corresponding to a first gray scale in the gray scale interval under the first dimming mode and the standard display brightness value, and the sixth sub-gamma value is a gamma value corresponding to a second gray scale in the gray scale interval under the first dimming mode and the standard display brightness value; and the fourth gamma value includes a seventh sub-gamma value and an eighth sub-gamma value, the seventh sub-gamma value is a gamma value corresponding to the first gray scale in the gray scale interval under the second dimming mode and the standard display brightness value, and the eighth sub-gamma value is a gamma value corresponding to the second gray scale in the gray scale interval under the second dimming mode and the standard display brightness value.

Alternatively, the third gamma value includes a plurality of gamma values respectively corresponding to a plurality of gray scales in the gray scale interval under the first dimming mode and the standard display brightness value, and the fourth gamma value includes a plurality of other gamma values respectively corresponding to the plurality of gray scales in the gray scale interval under the second dimming mode and the standard display brightness value.

Optionally, in some optional embodiments, the second data acquiring module 602 may be specifically configured to: determine the first gamma ratio and the second gamma ratio according to the following equation (3) or (4):

$$k1 = \left|\frac{\Delta\,\text{gamma1}}{\Delta\,\text{gamma01}}\right| \text{ and } k2 = \left|\frac{\Delta\,\text{gamma2}}{\Delta\,\text{gamma02}}\right|, \tag{3}$$

$$k1 = \frac{\overline{\text{gamma1}}}{\overline{\text{gamma01}}} \text{ and } k2 = \frac{\overline{\text{gamma2}}}{\overline{\text{gamma02}}}, \tag{4}$$

where k1 represents the first gamma ratio, k2 represents the second gamma ratio, Δgamma1 represents a difference between the first sub-gamma value and the second sub-gamma value, and Δgamma2 represents a difference between the third sub-gamma value and the fourth sub-gamma value; Δgamma01 represents a difference between the fifth sub-gamma value and the sixth sub-gamma value, and Δgamma02 represents a difference between the seventh sub-gamma value and the eighth sub-gamma value; $\overline{\text{gamma1}}$ represents an average value of gamma values respectively corresponding to a plurality of gray scales in the gray scale interval under the first dimming mode and the current display brightness value, $\overline{\text{gamma01}}$ represents an average value of gamma values respectively corresponding to the plurality of gray scales in the gray scale interval under the first dimming mode and the standard display brightness value, $\overline{\text{gamma2}}$ represents an average value of gamma values respectively corresponding to the plurality of gray scales in the gray scale interval under the second dimming mode and the current display brightness value, and $\overline{\text{gamma02}}$ represents an average value of gamma values respectively corresponding to the plurality of gray scales in the gray scale interval under the second dimming mode and the standard display brightness value.

In some optional embodiments, the determining module 603 may be specifically configured to: calculate a ratio of the second gamma ratio to the first gamma ratio, and calculate a product of the ratio and the first adjustment coefficient corresponding to the gray scale interval to obtain the second adjustment coefficient corresponding to the gray scale interval.

In some optional embodiments, the determining module 603 may be specifically configured to: determine the target compensation data corresponding to any one of the gray scale intervals according to the following equation (5):

$$M1 = M0\times\frac{DBVn}{DBV0}\times \text{fs\_2}, \tag{5}$$

where M1 represents the target compensation data, M0 represents the standard compensation data of the display panel under the first dimming mode and the standard display brightness value, DBVn represents a register value corresponding to the current display brightness value, DBV0 represents a register value corresponding to the standard display brightness value, and fs_2 represents the second adjustment coefficient.

Optionally, the standard display brightness value includes the maximum display brightness value of the display panel.

The apparatus 600 for compensating the display panel according to the embodiments of the present application can implement the various processes in the embodiments of the method for compensating a display panel as shown in FIG. 1, which will not be repeated herein.

Figure 7:
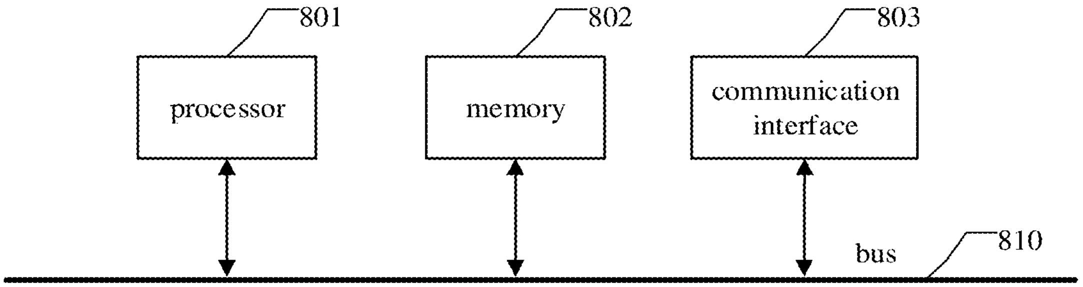
FIG. 7 shows a schematic structural diagram of an electronic device according to an embodiment of the present application.

FIG. 7 shows a schematic structural diagram of hardware of an electronic device according to the embodiments of the present application.

The electronic device may include a processor 801 and a memory 802 storing computer program instructions.

Specifically, the above processor 801 may include a central processing unit (CPU), or an Application Specific Integrated Circuit (ASIC), or one or more integrated circuits that may be configured to implement the embodiments of the present application.

The memory 802 may include a mass memory configured to store data or instructions. By way of example and not limitation, the memory 802 may include a Hard Disk Drive (HDD), a floppy disk drive, a flash memory, an optical disk, a magnetic disk, a magnetic tape, or a Universal Serial Bus (USB) drive, or a combination thereof. Where appropriate, the memory 802 may include a removable or non-removable (or fixed) medium. Where appropriate, the memory 802 may be internal or external to an integrated gateway disaster recovery device. In particular embodiments, the memory 802 is a non-volatile solid state memory. In particular embodiments, the memory 802 includes a read-only memory (ROM). Where appropriate, the ROM may be a mask programmed ROM, a programmable ROM (PROM), an erasable PROM (EPROM), an electrically erasable PROM (EEPROM), an electrically alterable ROM (EAROM), or a flash memory, or a combination thereof. In an example, the memory may include a non-volatile transient memory.

The processor 801 reads and executes the computer program instructions stored in the memory 802 to implement the method for compensating a display panel in any one of the above embodiments.

In one example, the electronic device may further include a communication interface 803 and a bus 810. Herein, as shown in FIG. 7, the processor 801, the memory 802, and the communication interface 803 are connected and communicate with each other via the bus 810.

The communication interface 803 is mainly configured to achieve the communication among the various modules, apparatuses, units, and/or devices in the embodiments of the present application.

The bus 810 includes hardware, software, or both, to couple the components of the electronic device with each other. By way of example and not limitation, the bus may include an Accelerated Graphics Port (AGP) or other graphics buses, an Enhanced Industry Standard Architecture (EISA) bus, a Front Side Bus (FSB), a Hyper Transport (HT) interconnect, an Industry Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, or other suitable buses, or a combination thereof. Where appropriate, the bus 810 may include one or more buses. Although specific buses are described and illustrated in the embodiments of the present application, the present application contemplates any suitable bus or interconnect.

The electronic device may execute the method for compensating a display panel according to the embodiments of the present application, so as to implement the method for compensating a display panel and the apparatus for compensating the display panel described in conjunction with FIG. 1 and FIG. 6.

The embodiments of the present application further provide a computer-readable storage medium storing a computer program thereon, in which the computer program may implement, when executed by a processor, the method for compensating a display panel in the above embodiments and can achieve the same technical effect, which is not repeated herein. Herein, the above computer-readable storage medium may include a Read-Only Memory (ROM), a Random Access Memory (RAM), a magnetic disk, or a compact disc, which is not limited herein.

The functional block as shown in the structure diagram described above may be embodied as hardware, software, firmware or a combination thereof. When embodied as hardware, the functional block may be, for example, an electronic circuit, an Application Specific Integrated Circuit (ASIC), an appropriate firmware, plug-in, function card, and the like. When embodied as software, the element of the present application is a program or code segment that is configured to perform a desired task. The program or code segment may be stored in a machine-readable medium, or transmitted over a transmission medium or a communication link by means of a data signal carried in a carrier. The "computer-readable storage medium" may include any medium capable of storing or transmitting information. Example of the computer-readable storage medium include an electronic circuit, a semiconductor memory device, a ROM, a flash memory, an erasable ROM (EROM), a floppy disk, a CD-ROM, an optical disk, a hard disk, a fiber-optic medium, an RF link, and the like. The code segment may be downloaded via a computer network such as the Internet, Intranet.

According to the embodiments of the present application, the computer-readable storage medium may be a non-transitory computer-readable storage medium.

It should also be noted that the exemplary embodiments in the present application describe some methods or systems based on a series of steps or apparatuses. However, the present application is not limited to the above order of the steps, i.e., the steps may be performed in the order described in the embodiments or in a different order than the order in the embodiments, or several steps may be performed simultaneously.

Aspects of the present application are described above with reference to the flowchart and/or block diagram of the method, apparatus (system), and computer program product according to the embodiments of the present application. It should be understood that each block in the flowchart and/or block diagram and a combination of the blocks in the flowchart and/or block diagram may be implemented by computer program instructions. These computer program instructions may be provided to a processor of a general-purpose computer, a specialized computer, or other programmable data processing device to produce a machine, so that these instructions, executed by the processor of the computers or other programmable data processing device, enable the implementation of the function/action specified in one or more blocks of the flowchart and/or block diagram. Such a processor may be, but is not limited to, a general purpose processor, a specialized processor, a special application processor, or a field programmable logic circuit. It should also be understood that each block in the block diagram and/or flowchart and a combination of the blocks in the block diagram and/or flowchart may also be implemented by specialized hardware that performs specified function or action, or by a combination of specialized hardware and computer instructions.

The above embodiments of the present application do not exhaustively describe all the details, nor do they limit the present application to the specific embodiments as described. Obviously, according to the above description, many modifications and changes can be made. These embodiments are selected and particularly described in the specification to better explain the principles and practical applications of the present application, so that a person skilled in the art is able to utilize the present application and make modifications based on the present application. The present application is limited only by the claims and the full scope and equivalents of the claims.

What is claimed is:

1. A method, adapted for compensating a display panel supporting a first dimming mode and a second dimming mode, the method comprising:

acquiring standard compensation data of the display panel under the first dimming mode and a standard display brightness value;

acquiring, according to a first adjustment coefficient under the first dimming mode and a current display brightness value, a second adjustment coefficient under the second dimming mode and the current display brightness value; and determining, according to the standard compensation data and the second adjustment coefficient, target compensation data corresponding to the display panel under the second dimming mode and the current display brightness value.

2. The method according to claim 1, wherein a gray scale range of the display panel is divided into a plurality of gray scale intervals; and the first adjustment coefficient comprises a plurality of adjustment coefficients respectively corresponding to the gray scale intervals under the current display brightness value and the first dimming mode, the second adjustment coefficient comprises a plurality of other adjustment coefficients respectively corresponding to the gray scale intervals under the current display brightness value and the second dimming mode, and the target compensation data comprises a plurality of compensation data of the display panel respectively corresponding to the gray scale intervals under the second dimming mode and the current display brightness value.

3. The method according to claim 2, wherein the acquiring, according to the first adjustment coefficient under the first dimming mode and the current display brightness value, the second adjustment coefficient under the second dimming mode and the current display brightness value comprises:

acquiring, for any one of the gray scale intervals, a first gamma value corresponding to a gray scale in the gray scale interval under the first dimming mode and the current display brightness value, and a second gamma value corresponding to the gray scale in the gray scale interval under the second dimming mode and the current display brightness value;

determining, according to the first gamma value and the second gamma value, a gamma ratio for switching from the first dimming mode to the second dimming mode; and determining, according to the gamma ratio and the first adjustment coefficient corresponding to the gray scale interval, the second adjustment coefficient corresponding to the gray scale interval.

4. The method according to claim 3, wherein the first gamma value comprises a first sub-gamma value and a second sub-gamma value, the first sub-gamma value is a gamma value corresponding to a first gray scale in the gray scale interval under the first dimming mode and the current display brightness value, and the second sub-gamma value is a gamma value corresponding to a second gray scale in the gray scale interval under the first dimming mode and the current display brightness value; and the second gamma value comprises a third sub-gamma value and a fourth sub-gamma value, wherein the third sub-gamma value is a gamma value corresponding to the first gray scale in the gray scale interval under the second dimming mode and the current display brightness value, and the fourth sub-gamma value is a gamma value corresponding to the second gray scale in the gray scale interval under the second dimming mode and the current display brightness value.

5. The method according to claim 4, further comprising:

determining the gamma ratio according to the following equation (1) or (2):

$$k = \left|\frac{\Delta\,\text{gamma2}}{\Delta\,\text{gamma1}}\right|, \tag{1}$$

$$k = \frac{\overline{\text{gamma2}}}{\overline{\text{gamma1}}}, \tag{2}$$

wherein k represents the gamma ratio, Δgamma1 represents a difference between the first sub-gamma value and the second sub-gamma value, and Δgamma2 represents a difference between the third sub-gamma value and the fourth sub-gamma value; and $\overline{\text{gamma1}}$ represents an average value of gamma values respectively corresponding to a plurality of gray scales in the gray scale interval under the first dimming mode and the current display brightness value, and $\overline{\text{gamma2}}$ represents an average value of gamma values respectively corresponding to the plurality of gray scales in the gray scale interval under the second dimming mode and the current display brightness value.

6. The method according to claim 4, wherein the first gray scale is a maximum gray scale in the gray scale interval, and the second gray scale is a minimum gray scale in the gray scale interval.

7. The method according to claim 3, wherein the first gamma value comprises a plurality of gamma values respectively corresponding to a plurality of gray scales in the gray scale interval under the first dimming mode and the current display brightness value, and the second gamma value comprises a plurality of other gamma values respectively corresponding to the plurality of gray scales in the gray scale interval under the second dimming mode and the current display brightness value.

8. The method according to claim 3, further comprising:

acquiring a third gamma value corresponding to the gray scale in the gray scale interval under the first dimming mode and the standard display brightness value, and a fourth gamma value corresponding to the gray scale in the gray scale interval under the second dimming mode and the standard display brightness value, wherein the determining, according to the first gamma value and the second gamma value, the gamma ratio for switching from the first dimming mode to the second dimming mode comprises:

determining, according to the first gamma value and the third gamma value, a first gamma ratio of the current display brightness value relative to the standard display brightness value under the first dimming mode, and determining, according to the second gamma value and the fourth gamma value, a second gamma ratio of the current display brightness value relative to the standard display brightness value under the second dimming mode; and the determining, according to the gamma ratio and the first adjustment coefficient, the second adjustment coefficient corresponding to the gray scale interval comprises:

determining the second adjustment coefficient corresponding to the gray scale interval according to the first gamma ratio, the second gamma ratio, and the first adjustment coefficient corresponding to the gray scale interval.

9. The method according to claim 8, wherein the third gamma value comprises a fifth sub-gamma value and a sixth sub-gamma value, the fifth sub-gamma value is a gamma value corresponding to a first gray scale in the gray scale interval under the first dimming mode and the standard display brightness value, and the sixth sub-gamma value is a gamma value corresponding to a second gray scale in the gray scale interval under the first dimming mode and the standard display brightness value; and the fourth gamma value comprises a seventh sub-gamma value and an eighth sub-gamma value, the seventh sub-gamma value is a gamma value corresponding to the first gray scale in the gray scale interval under the second dimming mode and the standard display brightness value, and the eighth sub-gamma value is a gamma value corresponding to the second gray scale in the gray scale interval under the second dimming mode and the standard display brightness value.

10. The method according to claim 8, wherein the determining the second adjustment coefficient corresponding to the gray scale interval according to the first gamma ratio, the second gamma ratio, and the first adjustment coefficient corresponding to the gray scale interval comprises:

calculating a ratio of the second gamma ratio to the first gamma ratio, and calculating a product of the ratio and the first adjustment coefficient corresponding to the gray scale interval to obtain the second adjustment coefficient corresponding to the gray scale interval.

11. The method according to claim 8, wherein the third gamma value comprises a plurality of gamma values respectively corresponding to a plurality of gray scales in the gray scale interval under the first dimming mode and the standard display brightness value, and the fourth gamma value comprises a plurality of other gamma values respectively corresponding to the plurality of gray scales in the gray scale interval under the second dimming mode and the standard display brightness value.

12. The method according to claim 11, wherein the determining, according to the first gamma value and the third gamma value, the first gamma ratio of the current display brightness value relative to the standard display brightness value under the first dimming mode, and determining, according to the second gamma value and the fourth gamma value, the second gamma ratio of the current display brightness value relative to the standard display brightness value under the second dimming mode comprise:

determining the first gamma ratio and the second gamma ratio according to the following equation (3) or (4):

$$k1 = \left|\frac{\Delta\,\text{gamma1}}{\Delta\,\text{gamma01}}\right| \quad \text{and} \quad k2 = \left|\frac{\Delta\,\text{gamma2}}{\Delta\,\text{gamma02}}\right|, \tag{3}$$

$$k1 = \frac{\overline{\text{gamma1}}}{\overline{\text{gamma01}}} \quad \text{and} \quad k2 = \frac{\overline{\text{gamma2}}}{\overline{\text{gamma02}}}, \tag{4}$$

wherein k1 represents the first gamma ratio, k2 represents the second gamma ratio, Δgamma1 represents a difference between the first sub-gamma value and the second sub-gamma value, and Δgamma2 represents a difference between the third sub-gamma value and the fourth sub-gamma value;

Δgamma01 represents a difference between the fifth sub-gamma value and the sixth sub-gamma value, and Δgamma02 represents a difference between the seventh sub-gamma value and the eighth sub-gamma value; and $\overline{\text{gamma1}}$ represents an average value of gamma values respectively corresponding to a plurality of gray scales in the gray scale interval under the first dimming mode and the current display brightness value, $\overline{\text{gamma01}}$ represents an average value of gamma values respectively corresponding to the plurality of gray scales in the gray scale interval under the first dimming mode and the standard display brightness value, $\overline{\text{gamma2}}$ represents an average value of gamma values respectively corresponding to the plurality of gray scales in the gray scale interval under the second dimming mode and the current display brightness value, and $\overline{\text{gamma02}}$ represents an average value of gamma values respectively corresponding to the plurality of gray scales in the gray scale interval under the second dimming mode and the standard display brightness value.

13. The method according to claim 8, wherein the standard display brightness value comprises a maximum display brightness value of the display panel.

14. The method according to claim 3, wherein the determining, according to the gamma ratio and the first adjustment coefficient corresponding to the gray scale interval, the second adjustment coefficient corresponding to the gray scale interval comprises:

calculating a product of the gamma ratio and the first adjustment coefficient corresponding to the gray scale interval, to obtain the second adjustment coefficient corresponding to the gray scale interval.

15. The method according to claim 2, wherein the determining, according to the standard compensation data and the second adjustment coefficient, the target compensation data corresponding to the display panel under the second dimming mode and the current display brightness value comprises:

determining the target compensation data corresponding to any one of the gray scale intervals according to the following equation (5):

$$M1 = M0 \times \frac{DBVn}{DBV0} \times \text{fs\_2}, \tag{5}$$

wherein M1 represents the target compensation data, M0 represents the standard compensation data of the display panel under the first dimming mode and the standard display brightness value, DBVn represents a register value corresponding to the current display brightness value, DBV0 represents a register value corresponding to the standard display brightness value, and fs_2 represents the second adjustment coefficient.

16. The method according to claim 1, wherein the standard compensation data comprises a standard compensation gray scale value.

17. A non-transitory computer readable storage medium storing a program or instruction thereon, wherein the program or instruction, when executed by a processor, implements steps of the method for compensating a display panel according to claim 1.

18. An apparatus for compensating a display panel supporting a first dimming mode and a second dimming mode, the apparatus comprising:

a first data acquiring module configured to acquire standard compensation data of the display panel under the first dimming mode and a standard display brightness value;

a second data acquiring module configured to acquire, according to a first adjustment coefficient under the first dimming mode and a current display brightness value, a second adjustment coefficient under the second dimming mode and the current display brightness value; and a determining module configured to determine, according to the standard compensation data and the second adjustment coefficient, target compensation data corresponding to the display panel under the second dimming mode and the current display brightness value.

* * * * *